Patented Apr. 13, 1926.

1,580,592

UNITED STATES PATENT OFFICE.

WILHELM EICHHOLZ AND OTTO DALMER, OF DARMSTADT, GERMANY.

INJECTABLE, HOMOGENEOUS, OILY PREPARATION OF BISMUTH AND MANUFACTURE OF THE SAME.

No Drawing.   Application filed November 26, 1924. Serial No. 752,460.

*To all whom it may concern:*

Be it known that we, WILHELM EICHHOLZ, 6 Kekulestrasse, Darmstadt, Germany, and OTTO DALMER, 14 Rhonring, Darmstadt, Germany, citizens of the Republic of Germany, have invented certain new and useful Improvements in Injectable, Homogeneous, Oily Preparations of Bismuth and Manufacture of the Same, of which the following is a clear, full, and exact description.

The object of this invention is the production of injectable, homogeneous, oily preparations of bismuth, hitherto unknown, and an improved process for manufacturing the same. As is well known, syphilis in man and experimental syphilis in rabbits are beneficially affected by bismuth. It is also a fact that the water-soluble bismuth compound cannot be injected either by the intravenous, hypodermic, or intramuscular routes, intravenous injection being toxic, while hypodermic and intramuscular administration is very painful. The only method that hitherto could be employed was the intramuscular injection of oily suspensions of some bismuth compound, although such use is connected with certain disadvantages. For example, the suspensions must be shaken for some time before they can be injected, owing to the fact that sedimentation takes place of the heavy bismuth salts. For this reason, to facilitate mixing of the contents, glass beads have been placed at the bottom of the ampoules in the case of the bismuth preparations hitherto obtainable in commerce.

We have found that a soluble, homogeneous, oily bismuth preparation may be obtained which avoids such objections by triturating bismuth naphthenate with fatty oils, and warming, or by dissolving them in a volatile ether, and allowing this to volatilize after solution is complete.

The preparation made in this way does not decompose on being brought into contact with water. It is stable even when kept exposed to the air and may be injected into the body without the risk of acids being split off. Another point of advantage is that it does not attack the metal parts of the syringe and the injections are painless.

It could, by the way, not by any means be foreseen that bismuth naphthenates would be soluble in oil, paraffin, or similar bodies. On the contrary, these findings were very surprising in view of the fact that the bismuth soaps, and some of the metallic naphthenates also, e. g. aluminum naphthenate, are insoluble in oils. From the literature it appears that bismuth naphthenate has never before been made.

*Examples.*

(1) A solution of 100 gm. sodium naphthenate in 1000 c. c. of water is treated with another solution made of 50 gm. bismuth nitrate, $Bi(NO_3)_3 5H_2O$, together with 15 gm. mannite in 500 c. c. of water. The resulting bismuth naphthenate is immediately taken up in chloroform or ether, and the ether or chloroform solution dried. After adding 340 c. c. olive oil the volatile solvent is removed by warming in vacuo, and a clear solution is obtained of the bismuth naphthenate in oil, containing 5 per cent bismuth.

(2) 100 parts of a 10 per cent aqueous sodium naphthenate solution are intimately mixed, by turbinating or shaking, with 50 parts of paraffin oil, and under constant stirring are treated gradually with 30 parts of a solution obtained by dissolving 6 parts of bismuth nitrate in 20 parts of a 10 per cent mannite solution and diluting the bismuth nitrate-mannite solution so obtained with water to treble its volume. Having added all the bismuth solution, stirring is continued for some time. The whole is then allowed to settle until the oily and aqueous layers have clearly separated, a process requiring a few minutes only. The paraffin solution being on top is removed, dried, over sodium sulphate, and filtered. The resulting product is a completely clear solution of bismuth naphthenate in paraffin oil.

Having thus described our invention and the manner in which the same is to be performed, what we claim and desire to secure by Letters Patent is:

1. The process of preparing injectable, homogeneous, oily preparations of bismuth by dissolving bismuth naphthenate in oils, 2. The process of preparing an injectable, homogeneous, oily preparation of bismuth by dissolving bismuth naphthenate and an oil in volatile solvents and by volatilizing the latter after solution has taken place.

3. As a new composition of matter, a solution of bismuth naphthenate in oils.

4. As a new composition of matter, a solution of bismuth naphthenate in paraffin oil.

In testimony whereof we have hereunto signed our names at Frankfort a/M this 8th day of November, 1924.

DR. WILHELM EICHHOLZ.
DR. OTTO DALMER.